ns Patent Office 3,812,082
Patented May 21, 1974

---

3,812,082
COMPLIANT POLYIMIDES
Robert J. Jones, Los Angeles, Calif., assignor to
TRW Inc., Redondo Beach, Calif.
No Drawing. Continuation-in-part of abandoned application Ser. No. 147,596, May 27, 1971. This application Dec. 18, 1972, Ser. No. 315,786
Int. Cl. C08g 20/32
U.S. Cl. 260—49                                3 Claims

---

ABSTRACT OF THE DISCLOSURE

A compliant polyimide having superior thermo-mechanical properties can be produced by reacting amine or isocyanate terminated polyaliphatic ethers with an aromatic tetracarboxylic acid or dianhydride. These polyimides display a long term thermo-oxidative stability and a high percent elongation to break, and they are suitable for use as films, fibers, coatings, adhesives, structures, and sealants.

---

The invention herein described was made under a contract or subcontract thereunder, with the Department of Defense.

BACKGROUND OF THE INVENTION

This is a continuation-in-part of copending application Ser. No. 147,596, filed May 27, 1971, now abandoned.

Polyimides in the prior art generally have been produced from highly aromatic monomers. These polyimides have exhibited good thermo-oxidative stability in temperature ranges up to 300° C. and 400° C. Thus, in applications where elevated temperatures and corrosive conditions exist, polyimides have been extensively employed. However, because polyimides exhibit low percentages of elongation to break, and because they exhibit essentially no recoverable elongation or elasticity, they have not been used for many applications such as seals or sealants, which required an elastomeric or compliant material.

SUMMARY OF THE INVENTION

The present invention proposes a polyimide which has high thermo-oxidative stability in addition to the property of recoverable elongation. Polyimides prepared according to this invention exhibit thermo-oxidative stability in temperatures ranging up to 350° C. and elongation to break of generally greater than 50%.

Briefly, polyimides according to this invention may be prepared by reacting a functionally terminated polyaliphatic ether with an aromatic dicarboxylic compound. Properties of the polyimide may be modified by the inclusion of aromatic amines as partial replacement for some of the polyaliphatic ether. A cross-linked polyimide can be effected by incorporating an aromatic tetraamine as a partial substitute for the polyaliphatic ether.

DESCRIPTION OF THE PREFERRED EMBODIMENTS

Polyaliphatic ethers used in this invention may be terminated with functional amine or isocyanate groups. The aliphatic groups in these ether compounds may contain between 1 and 6 carbon atoms between the oxygen atoms. Substituent groups on the carbon atoms may comprise halogens or oxygen atoms. Molecular weights of these compounds can range from 300 to 10,000, with 500 to 5,000 molecular weight being preferred for most applications. The proportion of the polyaliphatic ether may range from about 2% to about 98% by weight of the polyimide product depending upon the molecular weight used. Expressed in mole ratios the functionally terminated polyaliphatic ether may range from 0.02 to 1 for each mole of tetracarboxy compound, or if an aromatic amine is included in the polyimide, preferably the ratio can range from 0.3 to 0.05 for each mole of tetracarboxy compound. Ether groups in these compounds provide a polar group whch is adhesion, repels hydrocarbons, and is compatible with most structural metals. The structure of these polyaliphatic ethers may be represented by the following

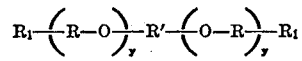

wherein R is a divalent aliphatic radical selected from the group consisting of alkylene groups, alkylidene groups, oxyalkylene groups having one to six carbon atoms, or haloalkylene groups having one to three carbon atoms; wherein R' is a divalent aliphatic radical selected from the group consisting of alkylene groups, oxyalkylene groups having one to six carbon atoms, and haloalkylene groups having five to ten carbon atoms; wherein $R_1$ is a monovalent radical of aromatic or alicyclic diisocyanate, isocyanate, or amine, and wherein y is an integer of from 1 to 150. Illustrations of the polyaliphatic ether diamines are polyoxoethylene diamines, polyoxobutylene diamines, polyoxoisopropylene diamines, polyoxoamylene diamines, polyoxohexamethylene diamines, and polyoxostyrene diamines.

Other polyaliphatic ethers of special interest comprise perfluoroaliphatic diisocyano ethers. These polyaliphatic ethers are represented by the following structures

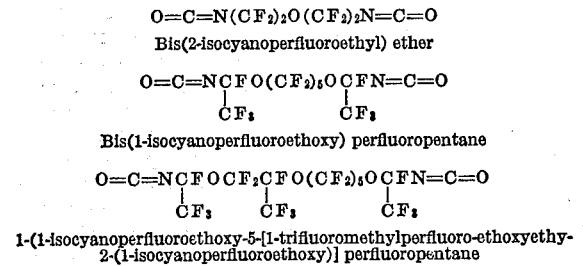

Polyimides made from these compounds exhibit thermo-oxidative stability at a substantially higher temperature range than polyaliphatic ethers.

The aromatic tetracarboxy compound which reacts with the polyaliphatic ethers to form the polyimide may be selected from any of the common tetra acid or dianhydride compounds which are commercially available. The aromatic tetracarboxy compounds suitable for use in this this invention may be illustrated by the following structure.

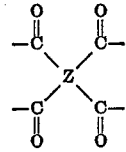

wherein Z is a tetravalent benzenoid radical such as

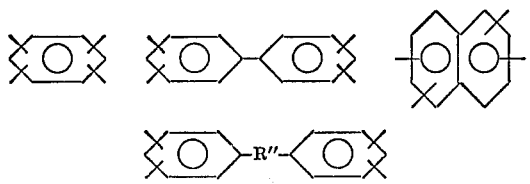

wherein R'' may be any of —O—, —S—, —SO$_2$—, —CO—, —CH$_2$, —C$_2$H$_4$—, —C$_3$H$_6$, or

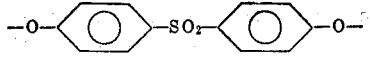

Illustrations of specific aromatic tetracarboxy compounds suitable for use in the present invention include: pyromellitic dianhydride, bis (3,4-dicarboxyphenoxyphenyl) sulfone dianhydride, bis (3,4-dicarboxylic acid phenoxyphenyl) sulfone, bis (3,4-dicarboxyphenyl) sulfone dianhydride, bis (3,4-dicarboxyphenyl) ether dianhydride, diphenyl tetracarboxylic dianhydride, naphthalene tetracarboxylic dianhydride, 2,2-bis (3,4-dicarboxyphenyl) propane dianhydride, benzene-1,2,3,4-tetracarboxylic acid, bis (dicarboxyphenyl) ethane dianhydride, benzophenone tetracarboxylic dianhydride, and bis (dicarboxyphenyl) methane dianhydride. Because of unusual stability and solubility characteristics, bis (3,4-dicarboxyphenoxyphenyl) sulfone dianhydride disclosed in copending Ser. No. 152,439, filed June 11, 1971, is preferred. The aromatic tetracarboxy compound can be present in a weight percent of from approximately 2% to approximately 98%, or in a range of mole ratios of from 1.0 to 1.2 with respect to the other constituents in the polyimide. Where the polyimide is constituted from only the aromatic tetracarboxy compound and the polyaliphatic ether, the mole ratio is approximately 1 to 1. If the polyaliphatic ether is partially replaced with an aromatic diamine, the sum of the fractional mole ratios of each constituent should equal 1 so as to maintain the 1 to 1 mole ratio. Additionally, if a portion of the polyaliphatic ether compound is replaced with an aromatic tri- or tetraamine, then the amount of the aromatic tetracarboxy compound must be increased to provide a range of mole ratios of from about 1.02 to 1.10 to allow for the cross-linking through tri- or tetraamine.

Modification of the polyimide properties may be effected by the substitution of aromatic amines for a portion of the polyaliphatic ether compound. The aromatic amines may be selected from diamines, triamines, or tetraamines, and these may be used individually or in combination as a partial substitution for the polyaliphatic ether, depending upon the polyimide properties desired by the formulator. Aromatic amines suitable for use in this invention may be represented by the following structures.

H$_2$N—X—NH$_2$

H$_2$N—X'—NH$_2$
         |
        NH$_2$

NH$_2$
         |
H$_2$N—X''—NH$_2$
         |
        NH$_2$ wherein X is a divalent benzenoid radical such as

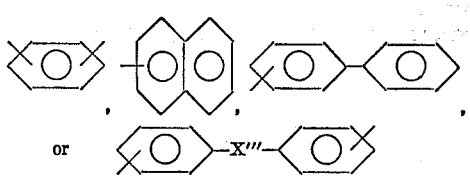

wherein X''' may be any of —O—, —S—, —SO$_2$—, —CH$_2$—, —C$_2$H$_4$—, —C$_3$H$_6$—, —CO—, or —C$_2$H$_2$— wherein X' is a trivalent benzenoid radical such as

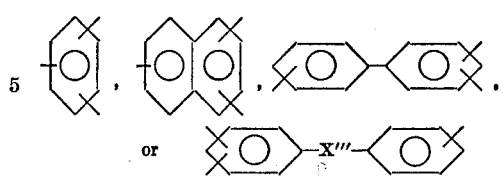

wherein X''' is the same as set forth above; and wherein X'' is a tetravalent benzenoid radical selected from the group consisting of

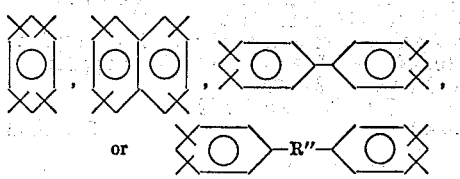

wherein R'' is selected from the group consisting of —O—, —S—, —SO$_2$—, —CO—, —CH$_2$—, —C$_2$H$_4$—, —C$_3$H$_6$—, and

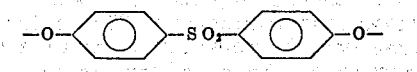

Illustrations of aromatic amines which are suitable for use in this invention are: diaminodiphenyl propane, benzidine, diaminobenzidine, dimethoxybenzidine, triaminobenzene, diamino naphthalene, diamino diphenyl methane, diamino diphenyl ether, triamino triphenyl methane, dichlorobenzidine, phenylene diamine, tetraaminobenzene, xylylene diamine, triamino triphenylcarbinol, tetraaminoanthraquinone, tetraaminobenzophenone, tetraaminodiphenyl ether, and bis(3,4-diaminophenoxyphenyl)sulfone. Because the aromatic amines may be included optionally into the polyimide composition, the range of mole ratios may be from 0 to 0.98 with the balance comprising polyaliphatic ethers to make up the mole ratio of 1. The preferred amount of aromatic diamine which may be used is in the range of 0.7 to 0.95 for each mole of tetracarboxy compound. When aromatic triortetraamines are included in the polyimide composition, the mole ratios may range from 0.0 to 0.1, or preferably 0.01 to 0.05, with the balance constituting the polyaliphatic ether or a mixture of the polyaliphatic ether and the diamine.

Polyimides according to this invention may be illustrated generally by the following formula:

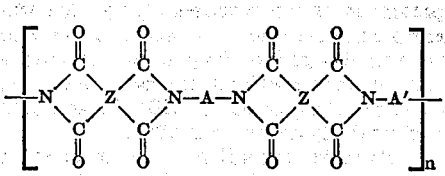

where A is the aforementioned polyaliphatic ether radical, A' is one of the aforementioned aromatic amine radicals, and $n$ is an integer from 2 to 2000.

These polyimides are prepared by first dissolving the polyaliphatic ether in a polar solvent. Examples of a few of the polar solvents which are suitable for this process are dimethylformamide, hexamethylphosphoramide, dimethylacetamide, dimethylsulfoxide, diethylformamide, and methylcaprolactam. If an aromatic amine is to be used in the production of the polyimide, the addition is made at the same time that the polyaliphatic ether is dissolved in the solvent. When the dissolution is completed, the solution is cooled prior to the addition of the aromatic tetracarboxy compound. After all the constituents have been included in the solution, the solution is rapidly stirred for a short time, usually about ten minutes, whereby a polyamic acid precursor is formed according to the following reaction:

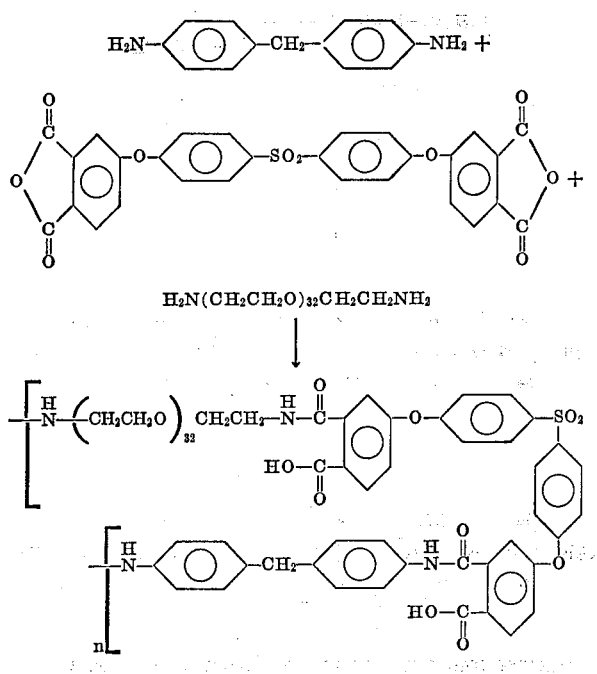

wherein $n=2$ to 2000.

The polyamic acid precursor is spread on a surface or cast in a suitable mold and placed in a vacuum oven to remove the solvent. The resulting polyamic acid is imidized by further heating in temperatures ranging from 100° to 240° C. for a predetermined time according to the following reaction:

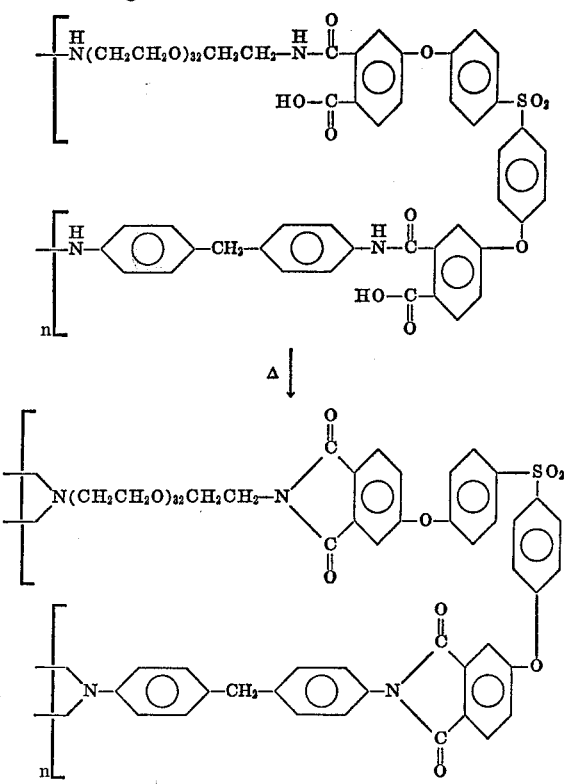

wherein $n=2$ to 2000.

Where a tetraamine is substituted for part of the polyaliphatic ether, the resulting cross-linked polyimide may be represented as follows:

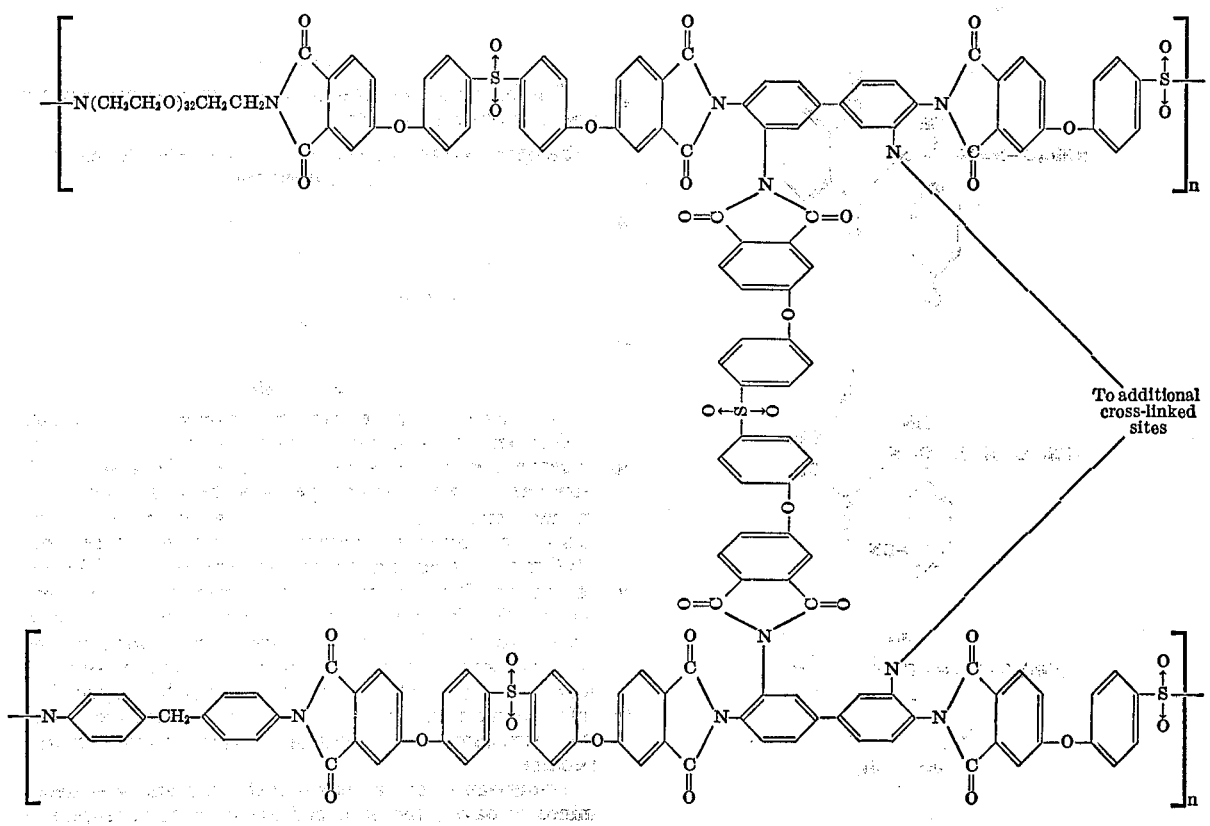

The invention will be more thoroughly understood by referring to the following examples.

PREPARATION OF POLYALIPHATIC ETHER DIAMINE

In a 500 ml. 3-necked round bottom flask fitted with a mechanical stirrer, thermometer, dropping funnel, and nitrogen inlet, approximately 124.4 gm. (0.20 mole) of 622 molecular weight polyoxoethylene glycol was dissolved in 120 ml. warm toluene. The system was purged with nitrogen and 2.6 gm. (0.48 mole) of ethylene imine in the dropping funnel was slowly added with stirring to the glycol. After the solution was homogenous, approximately 1½ to 2 ml. of boron trifluoride etherate was added drop-wise to the mixture via the dropping funnel. The mixture was then heated to 45° to 50° C. and stirred at this temperature for five hours. The product was recovered by stripping the toluene in a rotary evaporator under vacuum to give a waxy polyether diamine product (M.P., 44–46° C.).

EXAMPLE I

Approximately 10.00 gm. (0.001 mole) of polyoxyethylene diamine prepared according to procedure similarly to that described above, was dissolved in 4.5 ml. of hexamethylphosphoramide and stirred in a micro blender. The solution was cooled with Dry Ice and approximately 0.45 gm. (0.00083 mole) of solid bis (3,4-dicarboxyphenoxyphenyl) sulfone dianhydride was added. After completion of the addition, the stirring rate was increased and maintained for a ten minute period. The polyamic acid precursor was isolated by casting films on glass plates by a doctoring technique followed by removal of the solvent in a vacuum oven for one hour at 125° C. At this point the film was very elastic. According to infrared analysis, the film was imidized by heating at approximately 140° C. for three hours.

EXAMPLE II

Approximately 2.975 gm. (0.015 mole) of methylene dianiline and 6.525 gm. (0.005 mole) of polyoxyethylene diamine (1400 MW) were dissolved in 8.0 ml. of dimethylformamide and placed in a micro blender. With the blender stirring and cooled by an ice bath, a solution of 10,850 gm. (0.020 mole) of bis (3,4-dicarboxyphenoxyphenyl) sulfone dianhydride dissolved in 30.0 ml. dimethylformamide was slowly added to the blender. The stirring was continued at a fast speed for 5 minutes after complete dianhydride addition. The polyamic acid precursor was isolated by casting films directly on glass plates by doctoring technique. The dimethylformamide was removed by drying the plates at 125° C. for one hour in a vacuum and imidization was effected by heating the polyamic acid films at 250° C. for three hours. Properties of the polyimide product are set forth in the following table:

TABLE

| Property[a]: | Value |
|---|---|
| Tensile strength, p.s.i.[b] | 4600. |
| Elongation at break, percent[b] | 65. |
| Set at break, percent[c] | 25. |
| Modulus at break, p.s.i. | 80,000. |
| Low temperature characteristic | Compliant to <55° C.[d] |
| Thermal stability: | |
| In air | Stable to 205° C.[f] |
| In nitrogen | Stable to 230° C.[f] |
| In aircraft fuel[e] | Stable to 230° C.[f] |

[a] Cast film 0.004 inch thick.
[b] Stress/strain properties measured at room temperature on 0.50 inch wide specimens. Cross head speed 0.2 inch per minute.
[c] According to ASTM D412.
[d] Specimen was creased to zero radius at the stated temperature and was released. The specimen appeared unaffected by this treatment.
[e] Fuel was JP-4 conforming to MIL-J-5624.
[f] Isothermal aging in stated experiments for at least 160 hours.

EXAMPLE III

Approximately 0.30 gm. (0.001 mole) of bis (2-isocyanoperfluoroethyl) ether was dissolved in 21.0 ml. of dimethylformamide and was added to a micro blender. Stirring was started and 1.1 gm. (0.002 mole) of bis (3,4-dicarboxyphenoxyphenyl) sulfone dianhydride was added as a solid to the cooled polyaliphatic ether solution. After stirring for two minutes, 1.78 gm. (0.009 mole) of methylene dianiline was slowly added as a solid, followed by the addition of the remaining 4.33 gm. (0.008 mole) of dianhydride in one portion. Stirring was then continued for five additional minutes. The dimethylformamide solution was removed from the blender and the solvent was evaporated under vacuum at 130° C. The solid residue was dried at 230° C., dissolved in dimethylformamide and subsequently used to cast a film product by a doctoring technique onto a glass plate. This product possessed an inherent viscosity (0.5% w./v. sulfuric acid) of 0.29 at 30° C. and displayed an initial thermo-oxidative stability to >300° C.

EXAMPLE IV

Approximately 1.34 gm. (0.00675 mole) of methylene dianiline, 0.16 gm. (0.00075 mole) of diaminobenzidine and 3.25 gm. (0.0025 mole) of polyoxyethylene diamine in 10.0 ml. of dimethylformamide were placed in a 3-necked flask fitted with a mechanical stirrer. The reaction flask was cooled by an ice bath, the stirring started, and a solution of 5.60 gm. (0.0103 mole) bis (3,4-dicarboxyphenoxyphenyl) sulfone dianhydride in 15.0 ml. dimethylformamide was slowly added to the reaction flask over a three minute period. After the addition was complete, stirring was continued for 1 to 5 minutes, then the solution was cast onto an aluminum sheet and placed into a cold vacuum oven. The oven was evacuated, then the temperature was raised gradually to 200° C. and heating was continued for four hours at 200° C. The resultant product was cooled and the metal substrate was dissolved in a dilute aqueous hydrochloric acid solution. After the aluminum was removed, the polyimide film was again dried at 200° C. on a Teflon sheet under vacuum for two hours. Upon cooling, the desired film was easily removed from the Teflon sheet. The cured polyimide displayed properties similar to those shown in the table of Example 2.

I claim:

1. A polyimide having random recurring units of the following structures:

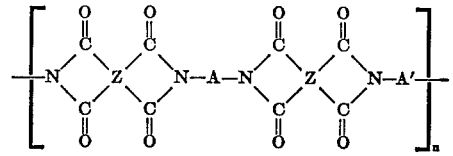

wherein A is

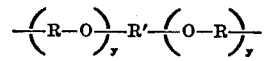

wherein R is a difunctional aliphatic radical selected from the group consisting of alkylene groups having 1 to 6 carbon atoms, alkylidene groups having 1 to 6 carbon atoms, haloalkylene groups having 1 to 3 carbon atoms, and oxyalkylene groups having 1 to 6 carbon atoms; wherein R' is a difunctional aliphatic radical selected from the group consisting of alkylene groups having 1 to 6 carbon atoms, haloalkylene groups having 5 to 10 carbon atoms, and oxyalkylene groups having 1 to 6 carbon atoms; wherein y is an integer from 1 to 150; wherein A' is a polyfunctional benzenoid radical selected from the group consisting of

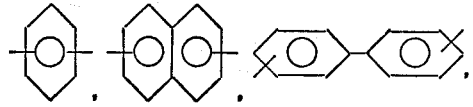

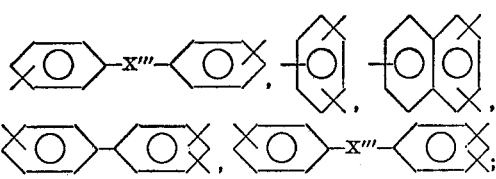

wherein X''' is selected from the group consisting of —O—, —S—, —SO₂—, —CH₂—, —C₂H₄—, —CO—, —C₃H₆—, and —C₂H₂—; and

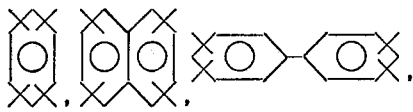

and

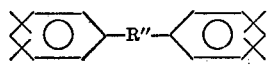

wherein R'' is selected from the group consisting of —O—, —S—, —SO₂—, —CO—, —CH₂—, —C₂H₄—, —C₃H₆—. and

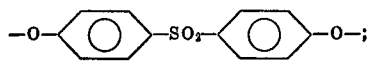

and Z are tetrafunctional benzenoid radicals selected from the group consisting of

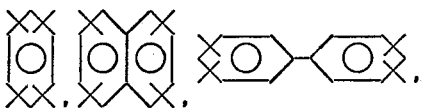

and

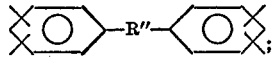

wherein R'' is selected from the group consisting of —O—, —S—, —SO₂—, —CO—, —CH₂—, —C₂H₄—, —C₃H₆—, and

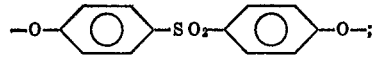

and A is present in a range of mole ratios of from 0.02 to 1.0 and has a molecular weight ranging from 300 to 10,000; said difunctional A' being present in a range of mole ratios of from 0.0 to 0.98 and said tri- or tetrafunctional A' being crosslinked through a Z imide linkage and is present in a range of mole ratios of from 0.0 to 0.1, the aggregate of said A and A' constituting a mole ratio of approximately 1 to said Z being present in a range of mole ratios of from 1.0 to 1.2, and $n$ is 2 to 2,000.

2. A polyimide according to claim 1 wherein said A is present in a range of mole ratios of from 0.3 to 0.05; and said difunctional A' is present in a range of mole ratios of from 0.7 to 0.95 to said Z present in a mole ratio of 1.

3. A polyimide according to claim 1 wherein said A is present in a range of mole ratios of from 0.3 to 0.05; said difunctional A' is present in a range of mole ratios of from 0.07 to 0.95; said trifunctional A' is present in a range of mole ratios of from 0.01 to 0.05; and said tetrafunctional A' is present in a range of mole ratios of from 0.01 to 0.05 to said Z present in a range of mole ratios of from 1.02 to 1.10.

References Cited

UNITED STATES PATENTS

| | | | |
|---|---|---|---|
| 3,179,614 | 4/1965 | Edwards | 260—30.2 |
| 3,532,637 | 10/1970 | Bell, Jr. et al. | 260—78 |
| 3,073,784 | 1/1963 | Endrey | 252—518 |
| 3,236,895 | 2/1966 | Lee et al. | 260—584 |
| 3,300,420 | 1/1967 | Frey | 260—2.5 |
| 3,314,923 | 4/1967 | Mueller et al. | 260—78 |
| 3,563,951 | 2/1971 | Radlmann et al. | 260—47 |

LESTER L. LEE, Primary Examiner

U.S. Cl. X.R.

117—132 B, 161 P; 260—30.6 R, 30.8 DS, 32.6 N, 47 CB, 47 CP, 63 N, 65, 77.5 R, 78 TF

UNITED STATES PATENT OFFICE
CERTIFICATE OF CORRECTION

PATENT NO. : 3,812,082
DATED : May 21, 1974
INVENTOR(S) : Robert J. Jones

It is certified that error appears in the above-identified patent and that said Letters Patent are hereby corrected as shown below:

Column 2, Line 47, change [ethoxyethy-] to --ethoxyethyl-.--

Column 2, Line 56, delete [this]

Column 3, Line 10, change [$-C_3H_6$, or] to -- $-C_3H_6-$, or --

Column 3, Line 68, change  to 

Column 7, Line 64, change [<55° C.$^d$] to -- <-55°C $^d$ --

Signed and Sealed this

Thirtieth Day of November 1976

[SEAL]

Attest:

RUTH C. MASON
*Attesting Officer*

C. MARSHALL DANN
*Commissioner of Patents and Trademarks*